United States Patent Office
3,407,466
Patented Oct. 29, 1968

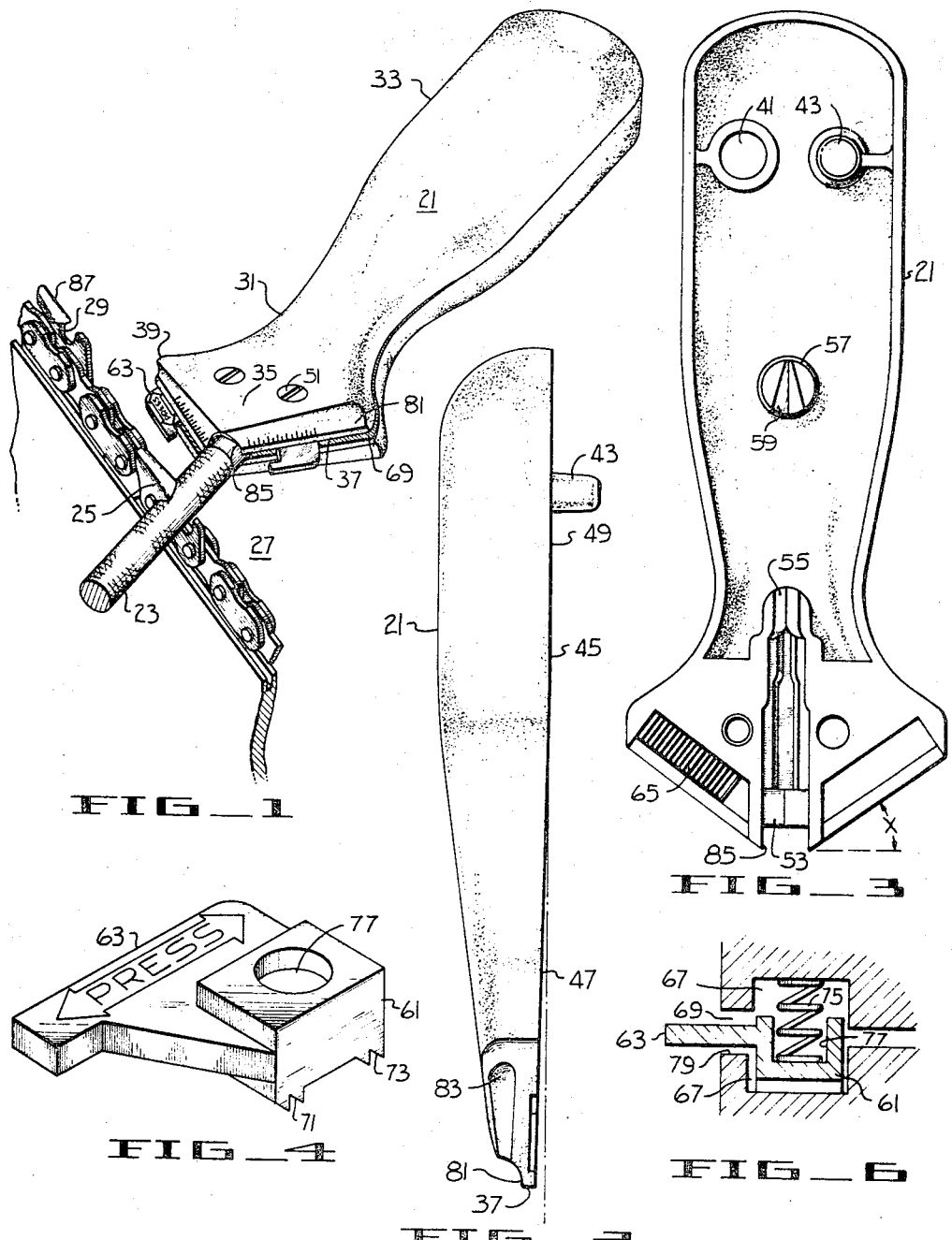

3,407,466
FILE GUIDE HANDLE
Elof Granberg, 2659 Mira Vista Drive,
Richmond, Calif. 94805
Filed Aug. 29, 1966, Ser. No. 575,644
10 Claims. (Cl. 29—80)

The present invention relates to handles for files and more particularly to a file handle and guide for chain saw sharpening.

Many chain saw cutting teeth configurations are presently utilized for chain saws. Generally, each cutter link is provided with a depth gauge at the forward end of the link and a cutting tooth at the rear end. Most saw chains are designed so that the teeth alternate to cut laterally opposite from the one ahead or behind.

There are a number of types of teeth presently in use. One type of tooth is the scorer. These teeth effect a bite along the lateral edges of the kerf (the kerf is the cut or incision made by the saw or other instrument). Scorers are generally disposed on opposite sides of the chain in tandem relation. The second type of tooth is a raker which cleans out the bottom of the kerf or the ridge left between the cuts of the scorers. Other chain saws provide cutting teeth configurations having compound curved cutting edges to cut the sides and bottom of the kerf simultaneously. All of these types of teeth are very difficult to sharpen.

The particular and precise configuration of the cutter links on the chain saw impose stringent requirements on the sharpening of the cutting edges of the teeth in order to prevent numerous problems from arising in the operation of the saw. Mainly, it is necessary that the teeth be accurately and properly sharpened to particular cutting angles and to uniform configuration and size to prevent unsteady cutting conditions which occur as a result of drag and wobble.

Each cutting edge is sharpened to meet two or three different cutting edge angle tolerances. First, corresponding cutting teeth must extend outward from the chain an equal amount. Otherwise, the tooth which extends further from the centerline of the chain will drag and wear excessively. Secondly, each cutting edge must be provided with the optimum angle of undercut in order to provide maximum cutting efficiency compatible with a reasonable life expectancy. If the angle of undercut is too acute, the chain cuts easier but dulls faster or is more susceptible to breakage. If the angle is too great, the converse occurs and the chain does not dull as rapidly but the cutting action is less efficient. And, thirdly, the angle of crosscut on the cutting edges of corresponding or similar teeth must be uniform to prevent excessive lateral drag which creates wobble in the chain during operation.

In view of the rather precise manner in which the kerf must be cut, and the requirement that the teeth be accurately sharpened to effect the proper cut to prevent unsteady cutting conditions, various tools have been developed for sharpening chain saw cutting teeth. One such tool is described in applicant's copending application, Ser. No. 390,970, filed Aug. 20, 1964, and entitled Chain Saw Sharpening Means. However, this tool is relatively expensive and generally unhandy to carry into the field.

A requirement exists in the art for a chain saw sharpening means which can easily be carried into the field and will provide the user with a guide to ascertain whether the teeth are properly sharpened.

Briefly, the present invention comprehends a file guide handle for chain saw sharpening comprising a file handle for engaging the tang of a rat tail or round file. The file handle includes means for determining the length, the angle of undercut, and the angle of crosscut of a saw chain cutting tooth during sharpening of a cutter link.

Therefore, it is an object of the present invention to provide a file guide handle for chain saw sharpening which includes means for determining the length of the cutting tooth during the sharpening of a cutter link.

It is another object of the present invention to provide a file guide handle for chain saw sharpening which includes means for determining the angle of undercut of the chain saw cutting tooth during the sharpening of a cutter link.

It is a further object of the present invention to provide a file guide handle for chain saw sharpening which provides a means for determining the angle of crosscut of the chain saw cutting tooth during the sharpening of a cutter link.

It is yet another object of the present invention to provide a file guide handle for chain saw sharpening which is inexpensive, simple to use, protects the user's hands from injury, and can be operated in the field without the necessity of a workbench or disassembly of the saw chain.

Other objects and advantages of the present invention will become apparent when the file guide handle is considered in conjunction with the accompanying drawings, of which:

FIGURE 1 is a perspective view of the file guide handle of the present invention shown in conjunction with a file and a portion of a saw chain;

FIGURE 2 is a side elevation of one-half of a disassembled file guide handle;

FIGURE 3 is a plan view of one-half of a disassembled file guide handle showing the internal construction;

FIGURE 4 is a perspective view of the gauge marker of the present invention;

FIGURE 5 is a schematic representation of the teeth of the gauge marker;

FIGURE 6 is a partial sectional view taken through the gauge marker and the leading edge of the file guide handle.

Reference is made to the drawings for a description of the invention. The perspective view of FIGURE 1 shows a file guide handle 21, and a file 23 supported therein, which is engaged with a cutting tooth 25 of a saw chain 27 in the approximate relation it would be when sharpening a cutter link 29. The handle is formed from two identical halves or shells which are disposed in opposed facing relation and secured together. Each half of the handle is formed with a necked-down portion 31 forward of the main handle body 33 which transitions into a generally planar head 35 and tapered leading edges 37. The wings 39 of the planar head provide protection to the fingers of the file guide user when he is sharpening the teeth of a chain saw. They prevent the fingers from slipping forward and inadvertently striking the sharp cutting edges of adjacent cutter links.

An offset female receptacle 41 (FIGURE 3), having a slightly tapered bore, is provided internally of the handle at the rear end thereof, adjacent one edge of the shell, for receiving a male projection. Likewise, a male projection 43 is disposed between the female receptacle 41 and the opposite edge of the shell and has a slightly tapering shank. When two handle halves are placed in opposed relation, the projections align with the receptacles. This arrangement of construction permits all of the file guide handle halves to be made from the same mold. The two halves may then be stamped together in opposing relation whereby the male and female mating portions of the handle are press fitted into permanent engagement.

The mating surfaces 45 (FIGURE 2) of the handles are provided with a tapered portion 47 extending forward from near the rear end of the handle. Flat accurately mating surfaces 49 are provided for approximately one-third of the handle length at the rear end thereof. The taper on the remaining portion, or the forward ends of the opposing surfaces, permits the forward end of the handle to be clamped down upon a file tang which is inserted between the two halves of the handle. Screws 51 (FIGURE 1) are provided in the planar head of the handle on opposite sides of the file for clamping the two halves of the handle onto the file.

The file is engaged with the handle by means of V-cut grooves 53, 55 (FIGURE 3) disposed in the forward ends of the handle halves. The forward V-cut groove 53 provides a seating platform for engaging the rear end of the file. A second seating platform 55 is disposed rearward of the first platform and is formed for engaging the forward end of the tang which projects from the rear end of the file. A rear supporting column 57 projects upward from the shell of the handle to provide an angled V-cut groove 59 which receives the tip of the tang. This provides three-point suspension of the rear end of the file which securely grasps it for sharpening the cutting teeth of a saw chain.

Means are provided on the file guide handle for determining the length of a cutting tooth of a cutter link. This is necessary because the height, or the projection of the tooth from the center line of the cutting chain, is directly related to the length of the tooth. Generally, the cutting tooth of the cutter link has a head which is tapered rearward and downward from the cutting edge which is disposed at the forward edge of the tooth. Therefore, if each of the cutting heads of the corresponding cutting teeth are of equal length, then the height of the teeth from the center line of the cutting chain can also be considered equal. This eliminates drag from higher teeth and effects equal removal of material by each tooth for smooth operation of the saw.

The means for determining the length of the cutting tooth comprises an adjustable gauge marker 61 (FIGURES 4 and 6) which is engaged with the leading edge 37 of the head 35 or flattened out portion of the handle and has a tab portion 63 extending outward from its leading edge. A serrated portion or rack of teeth 65 (FIGURE 3) is provided adjacent the leading edge 37 of the head of the handle in a cavity 67 (FIGURE 6) internal thereto. The individual teeth of the serrated portion 65 are disposed at increments of one thirty-second of an inch apart. When the two handle shells are secured together, the elongated internal cavity 67 provided adjacent each leading edge 37 of the file handle communicates with the leading edge by means of a slot 69 (FIGURES 1 and 6) formed by the separation between the leading edges of the file handle halves.

The movable gauge marker 61 is also provided with two pair of teeth 71, 73 (FIGURE 4). Each of these two pair of teeth are disposed at one thirty-second of an inch spacing between the two teeth within the same pair. This spacing is denoted by the letter $a$ in the schematic sketch of the teeth of the gauge marker shown in FIGURE 5 of the drawings. The two pair of teeth are disposed at a distance from each other equal to a multiple of one thirty-second of an inch plus a sixty-fourth of an inch. This distance is denoted by the small letter $b$ of FIGURE 5. The spacing between the teeth and the pairs of teeth may be denoted by a mathematical formula where $b$ equals a multiple of $a$ plus one-half $a$. This spacing of the teeth on the gauge marker 61 permits only one of its two pair of the gauge marker teeth 71, 73 to properly engage with the rack of teeth 65, and the other pair of teeth is positioned out of alignment with the rack of teeth. This arrangement permits the gauge marker to be moved in increments of a sixty-fourth of an inch along the rack of teeth, or along the measuring or leading edge 37 of the file guide handle. It permits a finer adjustment of the tab, but it does not require the detailed or precise formation of very small teeth to provide this spacing.

It is not necessary that the particular arrangement of the spacing of the teeth be provided in the increments set forth. The spacing can be described in the following manner: The tab includes two pair of spaced teeth which have an equal unit spacing $a$ between the teeth of each pair and the spacing $b$ between the pair of teeth is equal to a multiple of the unit spacing $a$ between the teeth of each pair plus a one-half unit of the spacing $a$ thereof; the spacing between the teeth of the rack of teeth in the handle is equal to the unit spacing $a$ between the individual teeth of the tab.

Utilization of the means for determining the length (and thereby the height) of the cutting teeth, requires pushing the file handle forward until the tab 63 of the gauge marker 61 is adjusted in relation to the rear edge of the tooth. If the tooth is being compared to the length of another tooth, then the tooth is sharpened until the tab just fits behind the tooth. However, if the tooth being measured is to be utilized as the standard tooth, then, after it has been sharpened, the file handle is pushed up against the tooth and the tab 63 moved along the leading edge 37 of the file guide handle until the rear end of the tooth is contacted. This establishes the length of the successive teeth to be sharpened.

The tab 63 is movable along the leading edge of the file guide handle in order to perform the functions just described. To permit this movement, spring means 75 (FIGURE 6) are included for holding the teeth of the gauge marker in engaging relation with the rack of teeth 65 disposed in the cavity 67 between the handles. A recess 77 (FIGURES 4 and 6) is provided in the gauge marker on the side opposite from the teeth. The tab 63 which projects outside of the handle extends in the form of a flange from the portion of the gauge marker which includes the teeth 71, 73 and the receptacle 77 for the spring 75. The gauge marker 61 is formed in a manner to permit pressure on the tab 63 to disengage the teeth of the gauge marker from the rack of teeth 65 and to permit the tab to move along the cavity 67. This is accomplished by having the tab pivot on the lip 79 (FIGURE 6) which forms a portion of the leading edge 37 of the handle and which forms one wall of the cavity 67. As the tab pivots, it lifts the teeth of the gauge marker clear of the rack of teeth whereby the gauge marker 61 can then be moved along the cavity so long as pressure is maintained upon the tab 63.

Means are provided on the file handle guide for determining the angle of undercut of the chain saw cutting tooth during sharpening of the cutter links. It is a general rule that to provide the proper angle of undercut on the cutting tooth, it is necessary that from one-tenth to one-fifth of the diameter of the file used to sharpen the tooth extend above the top of the tooth during sharpening. In the present invention, the handle is designed whereby the leading edge 37 provides means for effecting this measurement. The means includes a predetermined flat ridge 81 (FIGURE 2) which is disposed across the leading edge 37 of the file handle. During sharpening, this flat ridge is continuously kept aligned with the top surface of the tooth and the cutter link is automatically undercut to the proper depth.

In the present invention the flat ridge is formed by a concave section 83 (FIGURE 2) which is formed into the leading edge of the file handle. The concave section terminates perpendicular to the leading edge 37 and provides the flat surface 81 along the leading edge for aligning with the top of the cutting tooth of the cutter link.

The file guide handle of the present invention also includes means for determining the angle of crosscut of the saw chain cutting tooth during the sharpening of a cutter link. This means is effected by tapering the leading edge 37 of the file handle rearwardly, from the junction 85 (FIGURES 1 and 3) of the leading edge with the file, at an angle to the common axis of the handle and the file equal to the angle of crosscut of the cutting tooth. Angle $x$ (FIGURE 3) denotes the complement of the angle of taper. Normally this is approximately 35 degrees. Thus, when the angle of crosscut is properly sharpened into the cutting tooth, the leading edge 37 of the file handle will align with the longitudinal edge 87 (FIGURE 1) of the cutting tooth.

Generally, the cutting teeth are tapered laterally inward rearward of the cutting edge. This usually consists of just a few degrees and it need not be compensated for in the taper of the leading edge of the file handle. However, if the degree of taper is excessive, whereby aligning the leading edge of the handle with the edge of the cutting tooth would produce a crosscut outside of the limits which must be maintained, then the leading edge of the file handle can be tapered to an angle which compensates for the rearward taper of the tooth.

In conclusion, it will be clearly apparent that a novel and useful file handle guide for the sharpening of chain saws has been disclosed in the foregoing description and illustrated in the appended drawings. Although only a single embodiment of the subject invention is described, it will be apparent from the foregoing description of the invention, in its preferred form, that it will fulfill all the objects attributable thereto, and, while it has been illustrated and described in considerable detail, it is considered that any modifications and changes that fall within the scope of the appended claims shall be properly embraced thereby and that the protection is not to be limited to such details as has been illustrated and described except as may be necessitated by the appended claims.

I claim:

1. A file guide for chain saw sharpening comprising a file handle for engaging the tang of a file, said file handle including means for determining the length, the angle of undercut, and the angle of crosscut of the saw chain cutting tooth during the sharpening of a cutter link.

2. The file guide handle of claim 1 wherein said handle includes a leading edge adjacent the file and said means for determining the length of the saw chain cutting tooth during the sharpening of a cutter link comprises an adjustable gauge marker engaged with said leading edge.

3. The file guide of claim 2 wherein said tab includes positioning teeth and projects from an elongated cavity formed in the leading edge of said handle and said cavity includes a rack of teeth for engaging the positioning teeth of said gauge marker.

4. The file guide of claim 3 wherein the positioning teeth of said gauge marker include two pair of spaced teeth having an equal unit spacing between the teeth of each pair and the spacing between the pair of teeth is equal to a multiple of the unit spacing between the teeth of each pair plus a one-half unit spacing thereof and the spacing between the teeth of said rack of teeth is equal to the unit spacing between the teeth of each pair of teeth on said gauge marker.

5. The file guide of claim 3 wherein spring means are included for holding the teeth of said gauge marker in engaging relation with the rack of teeth of said cavity, and said gauge marker is formed in a manner to permit pressure thereon external to said leading edge to disengage the teeth of said gauge marker from said rack of teeth and to permit movement of said gauge marker along said leading edge.

6. The file guide of claim 1 wherein the means for determining the angle of undercut of a saw chain cutting tooth during the sharpening of a cutter link includes a predetermined flat ridge across the leading edge of said file handle for aligning with the top surface of the saw chain cutting tooth being sharpened when said cutter link is undercut to the proper depth.

7. The file guide of claim 6 wherein said flat ridge is formed by a concave section formed in the leading edge of said file guide handle and said concave section terminates perpendicular to said leading edge and provides a flat surface along said leading edge.

8. The file guide of claim 1 wherein the means for determining the angle of crosscut of the chain saw cutting tooth during the sharpening of a cutter link comprises said leading edge of said file handle being tapered rearwardly from said file at an angle to the common axis of said handle and said file equal to the angle of crosscut of said cutting tooth.

9. A file handle guide for chain saw sharpening comprising
   a file handle for engaging the tang of a round file, said file handle having a leading edge and a necked-down portion rearward of the leading edge,
   an adjustable gauge marker projecting from an elongated cavity formed in the leading edge of said handle, said gauge marker including positioning teeth and formed in a manner to permit pressure on said gauge marker external of said handle to disengage the teeth of said gauge marker from the rack of teeth of said cavity and to permit movement of said gauge marker along the leading edge of said handle,
   spring means for holding the teeth of said tab in engaging relation with the rack of teeth of said cavity,
   a predetermined flat ridge across the leading edge of said file handle for aligning with the top surface of a saw chain cutting tooth when the cutting edge of said cutting tooth is undercut to the proper depth, said flat ridge being formed by a concave section disposed in the leading edge of said file handle, said concave section terminating perpendicular to said leading edge, and
   said leading edge of said file handle being tapered rearwardly from said file at an angle to the common axis of said handle and said file equal to the angle of crosscut of said cutting tooth.

10. The file guide of claim 9 wherein the positioning teeth of said gauge marker includes two pair of spaced teeth having an equal unit spacing between the teeth of each pair and the spacing between the pair of teeth is equal to a multiple of the unit spacing between the teeth of each pair plus a one-half unit spacing thereof and the spacing between the teeth of said rack of teeth is equal to the unit spacing between the teeth of each pair of teeth on said gauge marker.

References Cited

UNITED STATES PATENTS

| | | | |
|---|---|---|---|
| 70,424 | 11/1887 | Disston | 76—36 |
| 438,271 | 10/1890 | Johnson | 29—80 |
| 1,039,602 | 9/1912 | Slingsby | 76—36 |
| 1,980,087 | 11/1934 | Rast | 29—80 X |
| 2,442,909 | 6/1948 | Tebo | 76—36 |

HARRISON L. HINSON, *Primary Examiner.*